4 Sheets--Sheet 2.

J. A. ROCHE & G. V. ORTON.
Band Sawing-Machines.

No. 144,797. Patented Nov. 18, 1873.

Witnesses:
Julius Wilcky
T. H. Spencer

Inventors:
John. A. Roche
Gerrit V. Orton

4 Sheets--Sheet 3.

J. A. ROCHE & G. V. ORTON.
Band Sawing-Machines.

No. 144,797. Patented Nov. 18, 1873.

Witnesses:
Julius Wilcke
T. H. Spencer

Inventors:
John A. Roche
Gerrit V. Orton

4 Sheets--Sheet 4.
J. A. ROCHE & G. V. ORTON.
Band Sawing-Machines.
No. 144,797. Patented Nov. 18, 1873.
Fig. 6
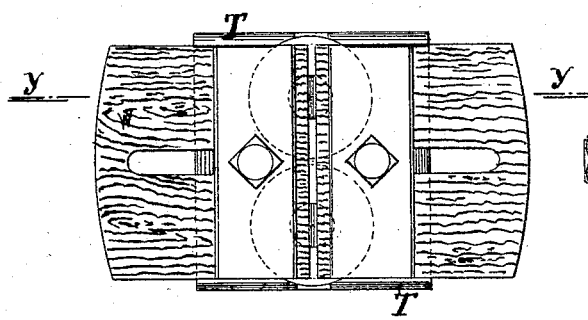
Fig. 7
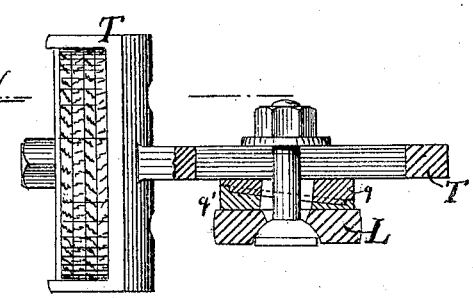
Fig. 8
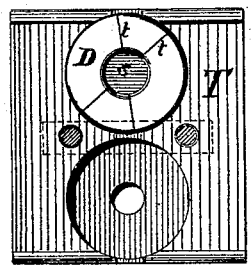
Fig. 9
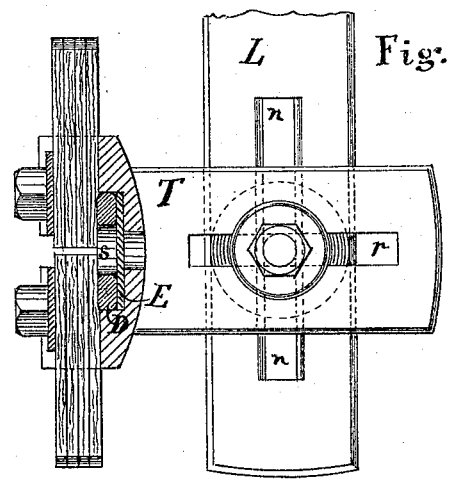
Fig. 11   Fig. 12   Fig. 10
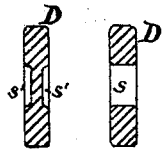
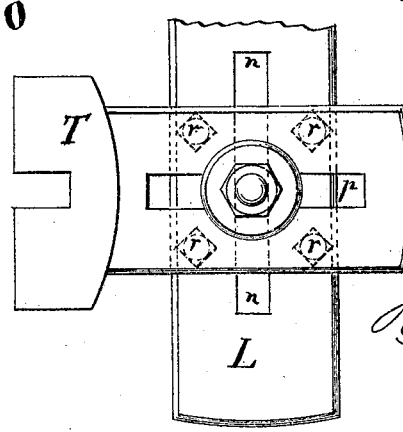
Witnesses:
Julius Wilck
J. H. Spencer
Inventors:
John A. Roche
Gerrit V. Orton

UNITED STATES PATENT OFFICE.

JOHN A. ROCHE AND GERRIT V. ORTON, OF CHICAGO, ILLINOIS; SAID ORTON ASSIGNOR TO SAID ROCHE.

IMPROVEMENT IN BAND SAWING-MACHINES.

Specification forming part of Letters Patent No. 144,797, dated November 18, 1873; application filed September 11, 1873.

*To all whom it may concern:*

Be it known that we, JOHN A. ROCHE and GERRIT V. ORTON, both of the city of Chicago, Cook county and State of Illinois, have invented certain Improvements in Band Sawing-Machines, of which the following is a specification:

Our invention relates, first, to the upper saw-guide and its connections, the object being to give the saw a stong adjustable guide, which shall be easily placed and stay in any position required without the aid of counterbalances, springs, or binding-screws; second, to the frame-work, which we construct in such a manner that, while we retain the cored or tubular form of frame, we divide the same into parts which are easily handled, and which afford better opportunity for properly dressing the faces where the working parts are attached, thus facilitating and cheapening very much the building of the machine, while it insures more perfect workmanship and absolute truth in the working parts of the machine; third, to the back-supports of the saw-guide, which we construct in a manner giving a large amount of wearing-surface to such supports; also, in the manner of attaching the guides by means of the introduction of beveled washers or set-screws, so that the guide may be easily adjusted to a vertical position or in the line of the saw; also, in giving the lower saw-guide a vertical adjustment, so that it may be raised or lowered, as the work to be performed may require.

Figure 1:
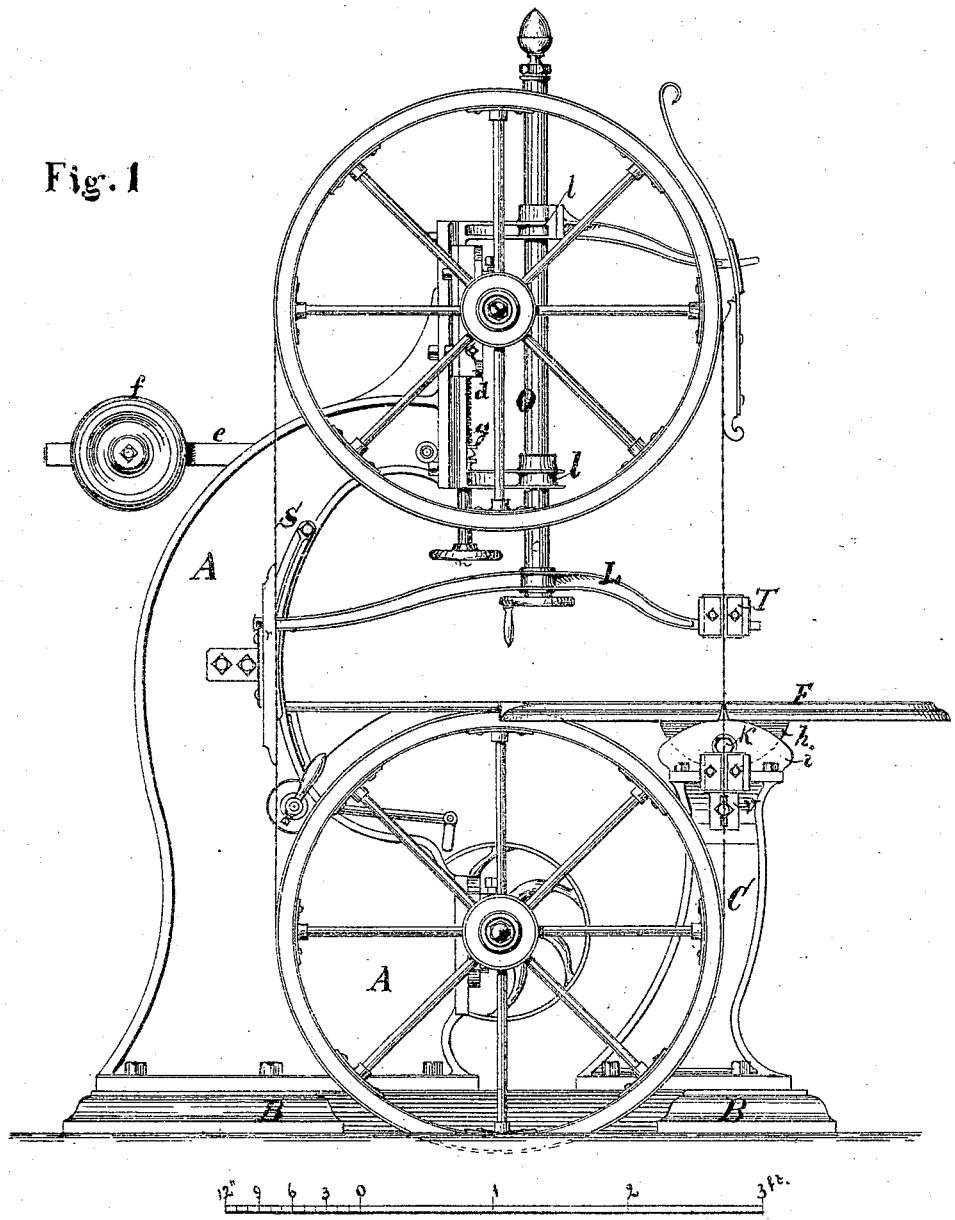
Figure 2:
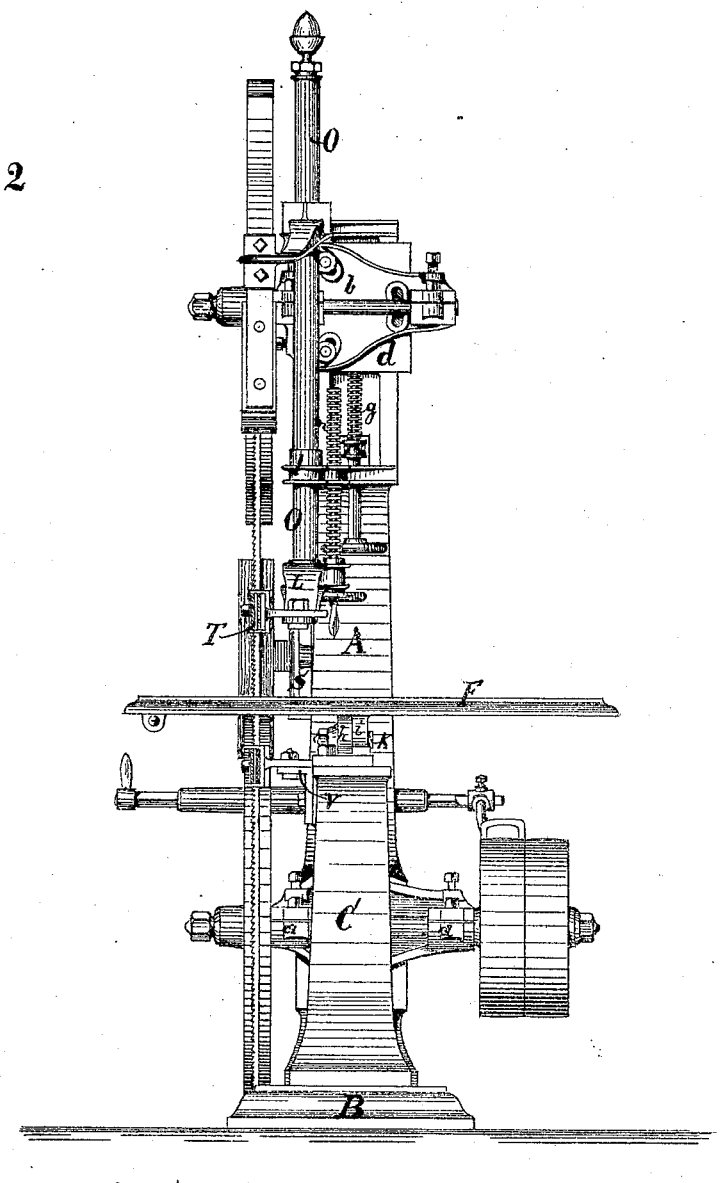
Figure 3:
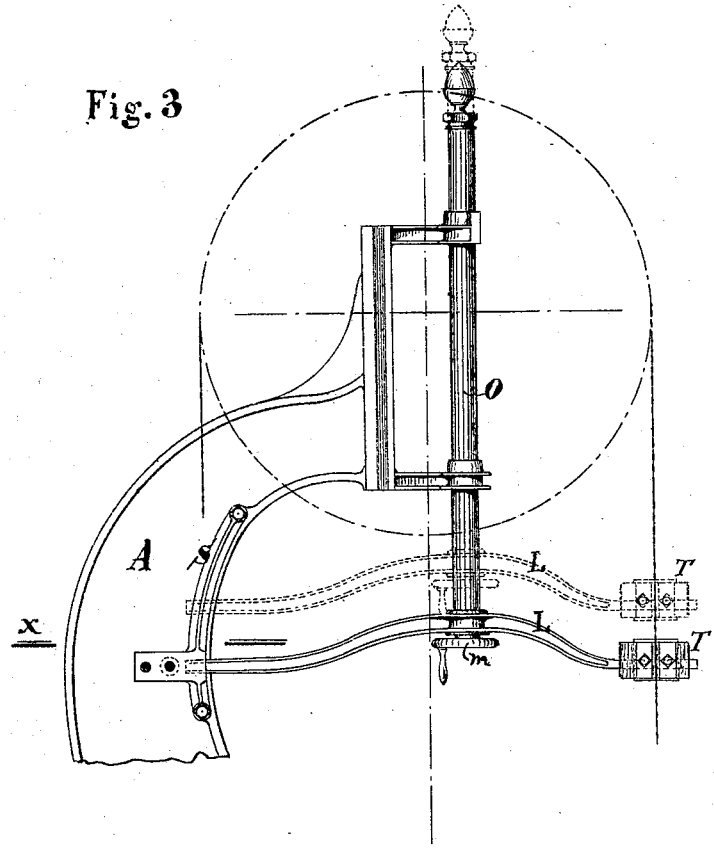
Figure 4:
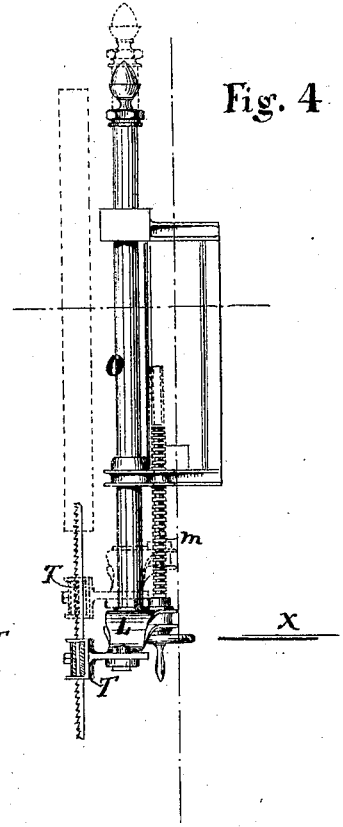
Figure 5:
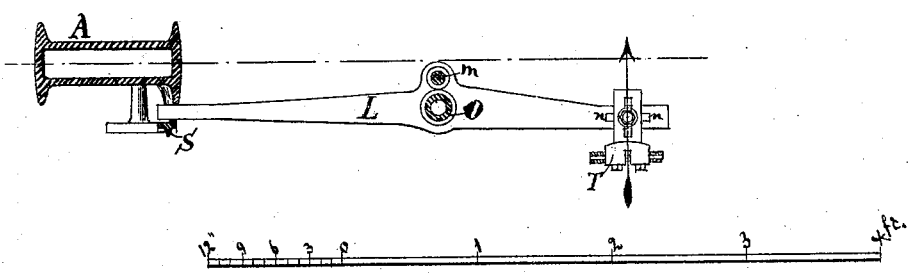

Figure 1 is a side elevation of a machine embodying our invention. Fig. 2 is an elevation, showing the end view which is at the right of Fig. 1. Figs. 3, 4, and 5 are portions of machine, of which Fig. 3 is a side view of the upper saw-guide and its connections at differents points of use. Fig. 4 is an end view of the same, and Fig. 5 is a sectional plan to line $x\,x$, Fig. 3. Fig. 6 is a front view of saw-guide. Fig. 7 is an end view of saw-guide, showing also section of portion of guide where connected by beveled collars to the guide-arm. Fig. 8 is a front view of the saw-guides with the plates and side guides removed, showing the back-supports and pocket for receiving the same. Fig. 9 is a sectional plan of saw-guide to line $y\,y$, Fig. 6, with its attachments. Fig. 10 is a similar plan as Fig. 9, showing another way for adjustment of saw-guides by means of set-screws in lieu of beveled washers. Figs. 11 and 12 are central sections of the saw-back supports D.

B is the base of the machine, upon which is bolted the main frame A and the table-support C, all of which are hollow or cored, the bearing-surfaces of which are planed to form a perfect joint, and that of the main frame A made square with the surfaces upon which the wheel-shaft supports are bolted. The lower wheel-boxes $a\,a$ are held upon their place by means of a pivot and four bolts, which allow the bearings to be adjusted as may be found necessary in constructing the machines, or as the bearings may become worn out of line by use. The upper box $b$ is also held to its place in the same manner as the lower, with the addition of an intermediate piece, $d$, which is gibbed to the main frame, giving an opportunity to strain the saw, and also to compensate for the difference in length of saws by means of the lever $e$, and weight $f$, and the screw $g$. The table F is bolted to its segmental support $h$, which, in turn, rests on its corresponding socket $i$, which is bolted to the support C, and has a stud-bolt, $k$, passing through the circular slot in the segmental support, which allows the table to tip at any angle required. L is a horizontal or lever arm, fastened near its middle to the vertical guide rod or tube O, (which guide rod or tube passes through two rigid arms, $l\,l$, attached to the main frame A,) and forms one guide, the bar S, together with the main frame, forming the other, as shown in Fig. 5. This horizontal arm forms a support for the saw-guide T. The screw $m$ is for raising and lowering the guide-arm to its position. By this arrangement, a space below the arm L is left unobstructed, which is important in this construction of machine, as it does not interfere with the use of the table. The arm L is provided with a slot, $w$, running lengthwise of the same, while the saw-guide T has a slot, $p$, running at right angles with the arm-slot, thus giving ample provision for adjustment of the guide. The guide T rests upon beveled washers $g\,g$, or, otherwise, upon set-screws $r\,r$, as shown in Figs. 7 and 10. The main part of the guide T is pocketed out to receive the back-supports D D, which are made of steel, glass, or other hard material. The back-supports D D are provided with circular openings *s s*. The purpose of this opening is to cut short the grooves *t t*, which will ultimately be formed therein by continual wearing of the saw, so that the next track of the saw formed after the readjustment of the back-support will not cross the groove before formed, as such groove would form a sharp corner which would cut the saw. The back-supports D D are so fitted that, when one side is completely worn out, they can be turned over, when another equally large surface will be obtained for the saw-back support. Immediately back of the back-support for the saw D is placed a spring, E, of rubber, steel, or other elastic substance, its object being to allow the back-support to yield and conform to the line of the saw. The lower saw-guide rests upon an L-shaped piece of iron, *v*, which is provided with a slot where its sustaining-bolt passes through it into the table-support C, which slot admits of the saw-guide's adjustment up and down, as occasion may require.

What we claim, and desire to secure by Letters Patent, is—

1. The arm or lever L, supporting the guide T, and adjustably connected with the stem O, all arranged above the table F, leaving an open space between the arm and table, substantially as specified.

2. The adjustable back-guide and saw-support T, affixed to the guide-arm L, with the beveled washers *g* and set-screws *r*, constructed in the manner and for the purpose set forth.

3. The combination of the spring E, support D, and guide T, arranged as and for the purpose herein described.

JOHN A. ROCHE.
GERRIT V. ORTON.

Witnesses:
JULIUS WELCKE,
C. DICKERSON.